US007966021B2

(12) United States Patent
Dietrich et al.

(10) Patent No.: US 7,966,021 B2
(45) Date of Patent: *Jun. 21, 2011

(54) ENHANCED WIRELESS NODE LOCATION USING DIFFERENTIAL SIGNAL STRENGTH METRIC

(75) Inventors: Paul F. Dietrich, Seattle, WA (US); Gregg Scott Davi, Milpitas, CA (US)

(73) Assignee: Cisco Systems, Inc., San Jose, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 11/854,499

(22) Filed: Sep. 12, 2007

(65) Prior Publication Data

US 2008/0004042 A1   Jan. 3, 2008

Related U.S. Application Data

(63) Continuation of application No. 10/938,460, filed on Sep. 10, 2004, now Pat. No. 7,286,835.

(51) Int. Cl.
*H04W 24/00* (2009.01)
(52) U.S. Cl. ............... 455/456.1; 455/456.5; 455/456.6
(58) Field of Classification Search ............... 455/456.1, 455/456.5, 456.6
See application file for complete search history.

(56) References Cited

U.S. PATENT DOCUMENTS

| | | | |
|---|---|---|---|
| 4,254,467 A | 3/1981 | Davis et al. | |
| 5,028,848 A | 7/1991 | Bankston et al. | |
| 5,327,144 A | 7/1994 | Stilp et al. | |
| 5,375,140 A | 12/1994 | Bustamante et al. | |
| 5,394,158 A | 2/1995 | Chia | |
| 5,396,582 A | 3/1995 | Kahkoska | |
| 5,564,079 A | 10/1996 | Olsson | |
| 5,570,412 A | 10/1996 | LeBlanc | 455/456.2 |
| 5,666,662 A | 9/1997 | Shibuya | |
| 5,684,860 A | 11/1997 | Milani | |
| 5,717,406 A | 2/1998 | Sanderford et al. | 342/457 |
| 5,732,354 A | 3/1998 | MacDonald | |
| 5,945,948 A | 8/1999 | Buford et al. | |
| 6,112,095 A | 8/2000 | Wax et al. | |
| 6,115,605 A | 9/2000 | Siccardo et al. | |

(Continued)

FOREIGN PATENT DOCUMENTS

EP    0 930 514 A2   7/1999

(Continued)

OTHER PUBLICATIONS

"Ekahau Logical Areas-location enabling the Wi-Fi network." Apr. 4, 2003. Ekahau, Inc., Saratoga, CA. Company's URL: www.ekahau.com.

(Continued)

*Primary Examiner* — Marivelisse Santiago-Cordero
(74) *Attorney, Agent, or Firm* — Baker Botts L.L.P.

(57) ABSTRACT

A wireless node location mechanism that employs a differential signal strength metric to reduce the errors caused by variations in wireless node transmit power, errors in signal strength detection, and/or direction-dependent path loss. As opposed to using the absolute signal strength or power of an RF signal transmitted by a wireless node, implementations of the location mechanism compare the differences between signal strength values detected at various pairs of radio receivers to corresponding differences characterized in a model of the RF environment. One implementation searches for the locations in the model between each pair of radio receivers where their signal strength is different by an observed amount.

1 Claim, 5 Drawing Sheets

U.S. PATENT DOCUMENTS

| | | | |
|---|---|---|---|
| 6,122,514 A * | 9/2000 | Spaur et al. ............... | 455/448 |
| 6,134,338 A | 10/2000 | Solberg et al. | |
| 6,134,448 A | 10/2000 | Shoji et al. | |
| 6,140,964 A | 10/2000 | Sugiura et al. | |
| 6,167,274 A | 12/2000 | Smith | |
| 6,198,935 B1 | 3/2001 | Saha et al. | |
| 6,212,391 B1 | 4/2001 | Saleh et al. | |
| 6,226,400 B1 | 5/2001 | Doll | |
| 6,236,365 B1 | 5/2001 | LeBlanc et al. | |
| 6,243,811 B1 | 6/2001 | Patel | |
| 6,249,252 B1 | 6/2001 | Dupray | |
| 6,269,246 B1 | 7/2001 | Rao et al. | |
| 6,272,541 B1 | 8/2001 | Cromer et al. | |
| 6,275,190 B1 | 8/2001 | Sugiura et al. | |
| 6,282,427 B1 | 8/2001 | Larsson et al. | |
| 6,304,218 B1 | 10/2001 | Sugiura et al. | |
| 6,317,599 B1 | 11/2001 | Rappaport et al. | |
| 6,317,604 B1 | 11/2001 | Kovach et al. | |
| 6,386,050 B1 * | 5/2002 | Yin et al. ............... | 73/861.95 |
| 6,414,634 B1 | 7/2002 | Tekinay | |
| 6,415,155 B1 | 7/2002 | Koshima et al. | |
| 6,441,777 B1 | 8/2002 | McDonald | |
| 6,456,892 B1 | 9/2002 | Dara-Abrams et al. | |
| 6,526,283 B1 | 2/2003 | Jang | |
| 6,556,942 B1 | 4/2003 | Smith | |
| 6,581,000 B2 | 6/2003 | Hills et al. | |
| 6,650,896 B1 | 11/2003 | Haymes et al. | |
| 6,664,925 B1 | 12/2003 | Moore et al. | |
| 6,674,403 B2 | 1/2004 | Gray et al. ............... | 342/463 |
| 6,704,352 B1 | 3/2004 | Johnson | |
| 6,728,782 B1 | 4/2004 | D'Souza et al. | |
| 6,754,488 B1 | 6/2004 | Won et al. | |
| 6,760,318 B1 | 7/2004 | Bims | |
| 6,766,453 B1 | 7/2004 | Nessett et al. | |
| 6,788,658 B1 | 9/2004 | Bims | |
| 6,799,047 B1 | 9/2004 | Bahl et al. ............... | 455/456.1 |
| 6,804,394 B1 | 10/2004 | Hsu | |
| 6,850,946 B1 | 2/2005 | Rappaport et al. | |
| 6,925,070 B2 | 8/2005 | Proctor | |
| 6,990,428 B1 | 1/2006 | Kaiser et al. ............... | 702/150 |
| 7,116,987 B2 * | 10/2006 | Spain et al. ............... | 455/456.1 |
| 7,116,988 B2 * | 10/2006 | Dietrich et al. ............... | 455/456.1 |
| 7,123,924 B2 | 10/2006 | Cuffaro | |
| 7,433,696 B2 * | 10/2008 | Dietrich et al. ............... | 455/456.2 |
| 7,519,372 B2 * | 4/2009 | MacDonald et al. ............... | 455/456.1 |
| 2002/0036569 A1 | 3/2002 | Martin | |
| 2002/0045424 A1 | 4/2002 | Lee ............... | 455/41 |
| 2002/0102988 A1 | 8/2002 | Myllymaki | |
| 2002/0115445 A1 | 8/2002 | Myllymaki | |
| 2002/0118118 A1 | 8/2002 | Myllymaki et al. | |
| 2002/0154134 A1 | 10/2002 | Matsui | |
| 2002/0168958 A1 | 11/2002 | Ford et al. | |
| 2002/0174335 A1 | 11/2002 | Zhang et al. | |
| 2002/0176366 A1 | 11/2002 | Ayyagari et al. | |
| 2002/0188723 A1 | 12/2002 | Choi | |
| 2003/0023746 A1 | 1/2003 | Loguinov | |
| 2003/0117985 A1 | 6/2003 | Fujii et al. | |
| 2003/0130987 A1 | 7/2003 | Edlund et al. | |
| 2003/0135486 A1 | 7/2003 | Edlund et al. | |
| 2003/0135762 A1 | 7/2003 | Macaulay | |
| 2003/0188006 A1 | 10/2003 | Bard | |
| 2003/0198208 A1 | 10/2003 | Koos, Jr. et al. | |
| 2004/0066757 A1 | 4/2004 | Molteni et al. ............... | 370/329 |
| 2004/0072577 A1 | 4/2004 | Myllymaki et al. | |
| 2004/0111397 A1 | 6/2004 | Chen et al. | |
| 2004/0151377 A1 | 8/2004 | Boose et al. | |
| 2004/0166878 A1 | 8/2004 | Erskine et al. ............... | 455/456.1 |
| 2004/0176108 A1 | 9/2004 | Misikangas | |
| 2004/0186847 A1 | 9/2004 | Rappaport et al. | |
| 2004/0198373 A1 | 10/2004 | Ford et al. | |
| 2004/0198392 A1 | 10/2004 | Harvey et al. ............... | 455/456.1 |
| 2004/0203910 A1 | 10/2004 | Hind et al. ............... | 455/456.1 |
| 2004/0236547 A1 | 11/2004 | Rappaport et al. | |
| 2004/0259554 A1 | 12/2004 | Rappaport et al. | |
| 2004/0259555 A1 | 12/2004 | Rappaport et al. | |
| 2005/0128139 A1 | 6/2005 | Misikangas et al. | |
| 2005/0131635 A1 | 6/2005 | Myllymaki et al. | |
| 2005/0136944 A1 | 6/2005 | Misikangas et al. | |
| 2005/0185615 A1 | 8/2005 | Zegelin ............... | 370/331 |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO 97/33386 | 9/1997 |
| WO | WO 98/41048 | 9/1998 |
| WO | WO 99/08909 | 2/1999 |
| WO | WO 02/43425 A1 | 5/2002 |
| WO | WO 02/054813 A1 | 7/2002 |
| WO | WO 03/023443 A2 | 3/2003 |

OTHER PUBLICATIONS

"Ekahau Positioning Engine 2.0: Product Overview." Apr. 4, 2003. Ekahau, Inc., Saratoga, CA. URL: http://www.ekahau.com/products/positioningengine/.

"Ekahau Positioning Engine 2.0: Data Sheet." Apr. 4, 2003. Ekahau, Inc., Saratoga, CA. URL: http://www.ekahau.com/pdf/EPE_2.0_datasheet.PDF.

"Indoor Positioning in 802.11b Networks." Apr. 4, 2003. Ekahau, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic." Apr. 22, 2003. Wireless Valley, Austin, TX. URL: http://www.wirelessvalley.com/Products/Optimatic/Optimatic.asp.

"Predictor." Apr. 22, 2003. Wireless Valley, Austin, TX. URL: http://www.wirelessvalley.com/Products/Predictor/Predictor.asp.

"LANFielder Product Literature." Feb. 10, 2004. Wireless Valley, Austin, TX. URL: http://www.wirelessvalley.com/Assets/brochures/LanFielder.pdf.

Conley, C.. "Securing WLANS with Location-Enabled Networks." *Wireless Security Perspectives*, vol. 5,No. 3.Mar. 2003. Organization's URL: www.cnp-wireless.com/wsp.html.

"Company Information." Apr. 6, 2004. Corsair Communications:A LightBridge Company, Burlington, MA. Company's URL: www.lightbridge.com.

"Corporate Fact Sheet." Aruba Wireless Networks, San Jose, CA. Feb. 10, 2004. URL: http://www.arubanetworks.com/pdf/coporate fact sheet.pdf.

"Airwave Rogue Access Point Detection." 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

"AeroScout WLAN Location System." Downloaded on Nov. 10, 2003 from http://www.bluesoft-inc.com/wlan.asp Bluesoft, Inc., San Mateo, CA.

"Cognio Announces Breakthrough Location Technology for WLAN Deployments." Downloaded on Nov. 10, 2003 from http://www.cognio.com/press_detail.asp?itemID=70 Cognio, Inc., Waltham, MA.

"WhereNet Main Page." Downloaded Nov. 10, 2003 from http://www.wherenet.com/WhereNet, Santa Clara, CA.

Small, J. Smailagic, A., and Siewiorek, D.P. "Determining User Location For Context Aware Computing Through the Use of a Wireless LAN Infrastructure." Institute for Complex Engineered Systems. Carnegie-Mellon University, Pittsburgh, PA, 2000. Available at http://www-2.cs.cmu.edu/~aura/docdir/small00.pdf.

Kishan, A., Michael, M., Rihan, S., and R. Biswas. "Halibut: An Infrastructure for Wireless LAN Location-Based Services." Technical paper for Course CS444n, Computer Science Department, Stanford University, Stanford CA, Jun. 2001. Previously available at http://fern2.stanford.edu/cs444n/paper.pdf.

Bahl, P. and Padmanabhan, V.N. "RADAR: An In-Building RF-based User Location and Tracking System." IEEE Infocom 2000, vol. 2, Mar. 2000, pp. 775-784.

"Positioning in Wireless Networks Reference." Downloaded on Jul. 28, 2005 from http://binary.engin.brown.edu/. BINARY Group, Division of Engineering, Brown University, Providence, RI. Available online at http://binary.engin.brown.edu/publication/Positioning_Ref.pdf.

Chirumamilla, Mohan K. and Ramamurthy, Byrav. "Agent Based Intrusion Detection and Response System for Wireless LANs." IEEE Int'l Conference on Communications, 2003, vol. 1, pp. 492-496.

"IBM Research Demonstrates Industry's First Auditing Tool for Wireless Network Security." Jul. 12, 2001, Hawthorne, N.Y. IBM Research News, 'Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM NIEUWS, 'Online! URL: http://domino.research.ibm.com/comm/pr.nsf/pages/news.20020617_dwsa.html.

"Assessing Wireless Security with AiroPeek and AiroPeek NX." A WildPackets Academy Tutorial from www.wildpackets.com, WildPackets Inc., Walnut Creek, CA. Jan. 16, 2003. URL: http://www.wildpackets.com/elements/whitepapers/AiroPeek_Security.pdf.

"AiroPeek and Wireless Security: Identifying and Locating Rogue Access Points." A WildPackets Academy Tutorial from www.wildpackets.com, WildPackets Inc., Walnut Creek, CA. Jan. 16, 2003. URL: http://www.wildpackets.com/elements/whitepapers/RogueAccessPoints.pdf.

Craiger, J. P. "802.11, 802.1x, and Wireless Security." Jun. 23, 2002. From the SANS' Information Security Reading Room on www.sans.org, The SANS Institute, Bethesda, MD. URL: http://www.sans.org/rr/papers/68/171.pdf.

Baily, S. "Is IEEE 802.1X Ready for General Deployment?" Apr. 7, 2002. From the SANS' nformation Security Reading Room on www.sans.org, The SANS Institute, Bethesda, MD. URL: http://www.sans.org/rr/papers/9/709.pdf.

"Location Determination Papers", List of publications maintained by Moustafa A. Youssef, Department of Computer Science, University of Maryland, College Park, MD 20742. Available online, and downloaded Feb. 9, 2006 at http://www.cs.umd.edu/~moustafa/location_papers.htm.

"Positioning in Wireless Networks Reference" BINARY Group, Division of Engineering, Brown University, Providence, RI 02912, Available online, and downloaded Feb. 9, 2006 as binary.engin.brown.edu/publication/Positioning_Ref.pdf.

L.M. Ni, Y. Liu, Y.C. Lau and A.P. Patil. "LANDMARC: Indoor Location Sensing Using Active RFID." Proceedings of the First IEEE International Conference of Pervasive Computing and Communications 2003 (PerCom '03).

G. Wolfle, R. Wahl, P. Wertz, P. Wildbolz and F. Landstorfer. "Dominant Path Prediction Model for Indoor Scenarios." German Microwave Conference (GeMIC) 2005, Ulm (Germany), Apr. 2005 Paper.

P. Wertz, G. Wolfle, R. Hoppe, D. Zimmermann and F.M. Landstorfer. "Enhanced Localization Technique within Urban and Indoor Environments based on Accurate and Fast Propagation Models." European Wireless, 2002, Florence, Italy.

Steven Fortune, "Algorithms for prediction of indoor radio propagation", sjf@research.att.com, Jan. 7, 1998, Bell Laboratories, Murray Hill, New Jersey 07974.

A. Rajkumar, B.F. Naylor, F. Feisullin and L. Rogers, "Predicting RF Coverage in Large Environments using Ray-Beam Tracing and Partitioning Tree Represented Geometry", submitted to the ACM Journal of Wireless Networks after revision on Oct. 12, 1995, AT&T Bell Laboratories, Murray Hill, NJ 07974.

Reinaldo A. Valenzuela, Steven Fortune, and Jonathan Ling, "Indoor Propagation Prediction Accuracy and Speed Versus Number of Reflections in Image-Based 3-D Ray-Tracing", 1998, Bell Laboratories, Lucent Technologies, Holmdel, NJ 07733.

Bahl, P., Padmanabhan, V. and Balachandran, A. A Software System for Locating Mobile Users: Design, Evaluation and Lessons. Microsoft Research Technical Report MSR-TR-2000-12 [online], Apr. 2000 [retrieved on Jan. 26, 2006]: Retrieved from the Internet: < URL: http://research.microsoft.com/~padmanab/papers/radar.pdf>.

PCT Notification of Transmittal of The International Search Report and The Written Opinion of the International Searching Authority, or the Declaration (PCT Rule 44.1), dated Jan. 11, 2006, International Application No. PCT/USO5/06608).

$1^{st}$ Office Action from U.S. Appl. No. 10/802,366, the application which was filed on Mar. 16, 2004, entitled "Location of Wireless Nodes Using Signal Strength Weighting Metric".

$2^{nd}$ Office Action from U.S. Appl. No. 10/802,366, the application which was filed on Mar. 16, 2004, entitled "Location of Wireless Nodes Using Signal Strength Weighting Metric".

Office Action from U.S. Appl. No. 10/788,645, the application which was filed on Feb. 27, 2004, entitled "Selective Termination of Wireless Connections to Refresh Signal Information in Wireless Node Location Infrastructure".

Office Action from U.S. Appl. No. 10/794,842, the application which was filed on Mar. 5, 2004, entitled "Selective Termination of Wireless Connections to Refresh Signal Information in Wireless Node Location Infrastructure".

Office Action from U.S. Appl. No. 10/848,276, the application which was filed on May 18, 2004, entitled "Wireless Node Location Mechanism Featuring Definition of Search Region to Optimize Location Computation".

PCT Notification of Transmittal of the International Search Report and the Written Opinion of the International Searching Authority, or the Declaration (PCT Rule 44.1) dated Mar. 31, 2006, International Application No. PCT/US05/05927).

PCT Notification of Transmittal of the International Search Report and the Written Opinion of the International Searching Authority, or the Declaration (PCT Rule 44.1) dated Apr. 28, 2006, International Application No. PCT/US05/06528).

PCT Notification of Transmittal of the International Search Report and the Written Opinion of the International Searching Authority, or the Declaration (PCT Rule 44.1) dated Apr. 19, 2006, International Application No. PCT/US05/14062).

International Standard ISO/IEC 8802-11 ANSI/IEEE Std. 892.11, 1999 Edition, Part II: Wirelss LAN Medium Access Control (MAC) and Physical Layer (PHY) specifications, pp. 122-137.

"tcp-msq" Internet citation http://speed.cis.nctu.edu.tw/bandwith/opensource/, Data Sheet Cisco Aironet 1200 Series Access Point, pp. 1-13, posted Mar. 11, 2002.

* cited by examiner

Fig_1

Fig._2

Fig_3

Fig._4

Fig._5

ENHANCED WIRELESS NODE LOCATION USING DIFFERENTIAL SIGNAL STRENGTH METRIC

CROSS-REFERENCE TO RELATED PATENT APPLICATIONS

This application is a continuation of co-pending U.S. patent application Ser. No. 10/938,460 in the name of Paul F. Dietrich and Greg Scott Davi, filed on Sep. 10, 2004 now U.S. Pat. No. 7,286,835 and is incorporated herein by reference in its entirety for all purposes.

Additionally, this application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/183,704 in the name of Robert J. Friday, Patrice R. Calhoun, Robert B. O'Hara, Jr., Alexander H. Hills and Paul F. Dietrich, and entitled "Method and System for Dynamically Assigning Channels Across Multiple Radios in a Wireless LAN;"

U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,370 in the name of Patrice R. Calhoun, Robert B. O'Hara, Jr. and David A. Frascone, entitled "Wireless Network System Including Integrated Rogue Access Point Detection;"

U.S. patent application Ser. No. 10/447,735 in the name of Robert B. O'Hara, Jr., Robert J. Friday, Patrice R. Calhoun, and Paul F. Dietrich and entitled "Wireless Network Infrastructure including Wireless Discovery and Communication Mechanism;"

U.S. patent application Ser. No. 10/788,645 in the name of Robert J. Friday and Alexander H. Hills, entitled "Selective Termination of Wireless Connections to Refresh Signal Information in Wireless Node Location Infrastructure;"

U.S. patent application Ser. No. 10/802,366 in the name of Paul F. Dietrich, Gregg Scott Davi and Robert J. Friday, entitled "Location of Wireless Nodes Using Signal Strength Weighting Metric;" and U.S. patent application Ser. No. 10/848,276 in the name of Paul F. Dietrich, Gregg Scott Davi and Robert J. Friday, entitled "Wireless Node Location Mechanism Featuring Definition of Search Region to Optimize Location Computation."

FIELD OF THE INVENTION

The present invention relates to estimating the location of wireless nodes in wireless network environments and, more particularly, to a differential signal strength metric directed to improving the accuracy of wireless node location mechanisms.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

The rapid proliferation of lightweight, portable computing devices and high speed WLANs enables users to remain connected to various network resources, while roaming throughout a building or other physical location. The mobility afforded by WLANs has generated a lot of interest in applications and services that are a function of a mobile user's physical location. Examples of such applications include: printing a document on the nearest printer, locating a mobile user or rogue access point, displaying a map of the immediate surroundings, and guiding a user inside a building. The required or desired granularity of location information varies from one application to another. Indeed, the accuracy required by an application that selects the nearest network printer, or locates a rogue access point, often requires the ability to determine in what room a wireless node is located. Accordingly, much effort has been dedicated to improving the accuracy of wireless node location mechanisms.

The use of radio signals to estimate the location of a wireless device or node is known. For example, a Global Positioning System (GPS) receiver obtains location information by triangulating its position relative to four satellites that transmit radio signals. The GPS receiver estimates the distance between each satellite based on the time it takes for the radio signals to travel from the satellite to the receiver. Signal propagation time is assessed by determining the time shift required to synchronize the pseudo-random signal transmitted by the satellite and the signal received at the GPS receiver. Although triangulation only requires distance measurements from three points, an additional distance measurement from a fourth satellite is used for error correction.

The distance between a wireless transmitter and a receiver can also be estimated based on the strength of the received signal, or more accurately the observed attenuation of the radio signal. Signal attenuation refers to the weakening of a signal over its path of travel due to various factors like terrain, obstructions and environmental conditions. Generally speaking, the magnitude or power of a radio signal weakens as it travels from its source. The attenuation undergone by an electromagnetic wave in transit between a transmitter and a receiver is referred to as path loss. Path loss may be due to many effects such as free-space loss, refraction, reflection, and absorption.

In business enterprise environments, most location-tracking systems are based on RF triangulation or RF fingerprinting techniques. RF triangulation calculates a mobile user's location based upon the detected signal strength of nearby access points (APs). It naturally assumes that signal strength is a factor of proximity, which is true a majority of the time. However, the multipath phenomenon encountered in indoor RF environments does present certain difficulties in locating wireless nodes, since reflection and absorption of RF signals affects the correlation between signal strength and proximity. RF fingerprinting compares a mobile station's view of the network infrastructure (i.e., the strength of signals transmitted by infrastructure access points) with a database that contains an RF physical model of the coverage area. This database is typically populated by either an extensive site surveyor an RF prediction model of the coverage area. For example, Bahl et al., "A Software System for Locating Mobile Users: Design, Evaluation, and Lessons," describes an RF location system (the RADAR system) in a WLAN environment, that allows a mobile station to track its own location relative to access points in a WLAN environment.

The RADAR system relies on a so-called Radio Map, which is a database of locations in a building and the signal strength of the beacon packets emanating from the access points as observed, or estimated, at those locations. For example, an entry in the Radio Map may look like (x, y, z, $ss_i$ (i=1 ... n)), where (x, y, z) are the physical coordinates of the location where the signal is recorded, and $ss_i$ is the signal strength of the beacon signal emanating from the ith access point. According to Bahl et al., Radio Maps may be empirically created based on heuristic evaluations of the signals transmitted by the infrastructure radios at various locations, or mathematically created using a mathematical model of indoor RF signal propagation. To locate the position of the mobile user in real-time, the mobile station measures the signal strength of each of access points within range. It then searches a Radio Map database against the detected signal strengths to find the location with the best match. Bahl et al. also describe averaging the detected signal strength samples, and using a tracking history-based algorithm, to improve the accuracy of the location estimate. Bahl et al. also address fluctuations in RF signal propagation by using multiple Radio Maps and choosing the Radio Map which best reflects the current RF environment. Specifically, one access point detects beacon packets from other access points and consults a radio map to estimate its location, and evaluates the estimated location with the known location. The RADAR system chooses the Radio Map which best characterizes the current RF environment, based on a sliding window average of received signal strengths.

While the RADAR system works for its intended objective, even in this system, location accuracy decreases with the error in detecting the strength of RF signals. For example, individual differences as to how two different wireless nodes detect and report signal strength can cause errors in location, since the Radio Maps assume no error in such measurements. Accordingly, two wireless nodes in the same location that detect different signal strengths will compute different estimated locations. Still further, while the RADAR system allows a mobile station to track its own location, it does not disclose a system that allows the WLAN infrastructure to track the location of wireless nodes, such as rogue access points. Such a system is desirable as it obviates the need for special client software to be installed on the mobile stations.

This paradigm shift, however, presents certain problems. As discussed above, the Radio Maps in the RADAR system are constructed from the point of view of a wireless node in an RF environment that includes access points in known locations. In other words, the Radio Maps are constructed based on heuristic and/or mathematical evaluations of the propagation of signals from the access points to a wireless node at a given location. Accordingly, the RADAR system need not assume symmetry of path loss between a given location and the access points in the RADAR system, since the mobile station detects the signal strength of the access points and computes its own location. In addition, since the location of a wireless node is based on path loss, the transmit power of the radio transmitters used to determine location must also be known. In the RADAR system, this is not problematic, since the signals used to determine location are transmitted by access points, whose transmit power can be controlled or easily determined. Estimating location based on signals transmitted by a wireless node, however, can be problematic, since transmit power can vary among wireless device manufacturers, and/or may be individually configured by the mobile user. Furthermore, the more complicated issue of variable transmit power exists not only due to the device or intended application itself, but also due to placement of the wireless node (e.g., a RFID tag, etc.) placed among or inside of other objects, or located within or behind various physical barriers or obstructions.

One approach to this problem is to assume symmetry in path loss between a given location in an RF environment and the radio transceivers used to detect signals transmitted by the wireless nodes. Furthermore, these approaches also assume a uniform transmit power for the wireless nodes in light of the fact that legal regulations, as well as current chip set technology, generally places an upper limit on transmit power. These two assumptions, however, can significantly impact the accuracy of locating a wireless node. As discussed above, the RADAR system, for example, finds the location coordinates in the Radio Map that are the best fit based on the detected signal strengths. That is, for each point in the Radio Map, the location metric computes the Euclidean distance between the detected signal strength values and the values in the Radio Map.

The following equation provides an illustrative example, assume for didactic purposes that a given wireless node is detected by three access points. The signal strength samples are RSSIap1 RSSIap2, and RSSIap3, while the RF coverage maps for each of the access points are denoted as MAPap1, MAPap2, MAPap3, where the coverage maps include access point signal strength values detected or computed for different locations in a defined region. Again, assuming path loss symmetry and a uniform transmit power, individual error surfaces for each access point can be created based on the signal strength detected at each access point, (RSSIap1, etc.) and the signal strength values in the individual coverage maps (e.g., MAPap1, etc.). That is, the error surface is the difference between the observed signal strength at a given access point less the signal strength values in the coverage map. The locations in this coverage map where the difference is zero are the most likely locations. In many situations, however, the measured signal strengths, RSSIap1 RSSIap2, and RSSIap3, do not match the signal strengths recorded in the coverage maps MAPap1, MAPap2, MAPap3 at any one location. In this case, it is desirable to find the location that is "closest" to matching RSSIap1 RSSIap2, and RSSIap3—in other words, the location that minimizes some function of MAPap1, MAPap2, MAPap3, RSSIap1 RSSIap2, and RSSIap3. Bahl et al., supra, describe several ways in which this function is created, including minimum mean squared error, minimum distance, and minimum Manhattan grid distance. Furthermore, a total error surface, ErrSurf, can be computed based on the sum of the squares (to neutralize positive and negative differences) of the individual error surfaces (i.e., the difference between the detected signal strength values and the signal strength values in each coverage maps), as follows:

$$ErrSurf=[(RSSIap1-MAPap1)^2+(RSSIap2-MAPap2)^2+(RSSIap3-MAPap3)^2]/3$$

In one implementation, the estimated wireless node location is derived from the minimum or minimum of this total error surface.

However, a change in the wireless node's effective transmit power (or, in the RADAR system, inaccuracies in detecting signal strength by the wireless nodes) will adversely affect the accuracy of this metric. For example, an N dB difference between the actual and assumed transmit power of a wireless node would cause a N dB change in the detected signal strengths. Rather than merely shifting the individual signal strength differences for each point in the individual error surfaces up by some fixed amount, the individual differences between the detected signal strengths and the signal strength values in the error surface can change quite dramatically. Indeed, each point in the individual error surfaces are shifted an amount proportional to the dB error. This circumstance moves some areas of the total error surface up relative to others, and some areas of the total error surface down relative to others, significantly altering the shape of the error surface, as well as the location, shape, and size of its minima. It also creates unpredictable error with changes in transmit power. Similar problems will occur for a fixed error in the "link or path loss symmetry" where the path loss from access point to wireless node differs from the path loss from wireless node to access point by some fixed amount due to propagation characteristics, vantage point, and the like. In addition, sources of RF interference typically have unknown transmit powers, and may only partially overlap the frequency band in which wireless nodes operate. Estimating the location of these interference sources requires a method that does not depend entirely on the absolute detected signal strength value.

In light of the foregoing, a need in the art exists for a wireless node location mechanism that reduces the errors in computing the location of a wireless node due to commonly occurring circumstances, such as variations in wireless node transmit power, errors in signal strength detection, and/or direction-dependent path loss. Embodiments of the present invention substantially fulfill this need.

SUMMARY OF THE INVENTION

The present invention provides a wireless node location mechanism that employs a differential signal strength metric to reduce the errors caused by variations in wireless node transmit power, errors in signal strength detection, and/or direction-dependent path loss. As opposed to using the absolute signal strength or power of an RF signal transmitted by a wireless node, implementations of the present invention compare the differences between signal strength values detected at various pairs of radio receivers to corresponding differences characterized in a model of the RF environment. One implementation of the invention searches for the locations in the model between each pair of radio receivers where their signal strength is different by an observed amount. In other implementations, the differential signal strength metric can be used as one component of a wireless node location mechanism that also uses absolute signal strength values. As discussed in more detail below, the wireless node location mechanism can be incorporated into wireless network environments, such as 802.11 networks, to estimate the location of mobile stations, rogue access points and other wireless nodes.

DESCRIPTION OF PREFERRED EMBODIMENTS

A. Wireless Node Location and Differential Signal Strength Metric

Figure 1:
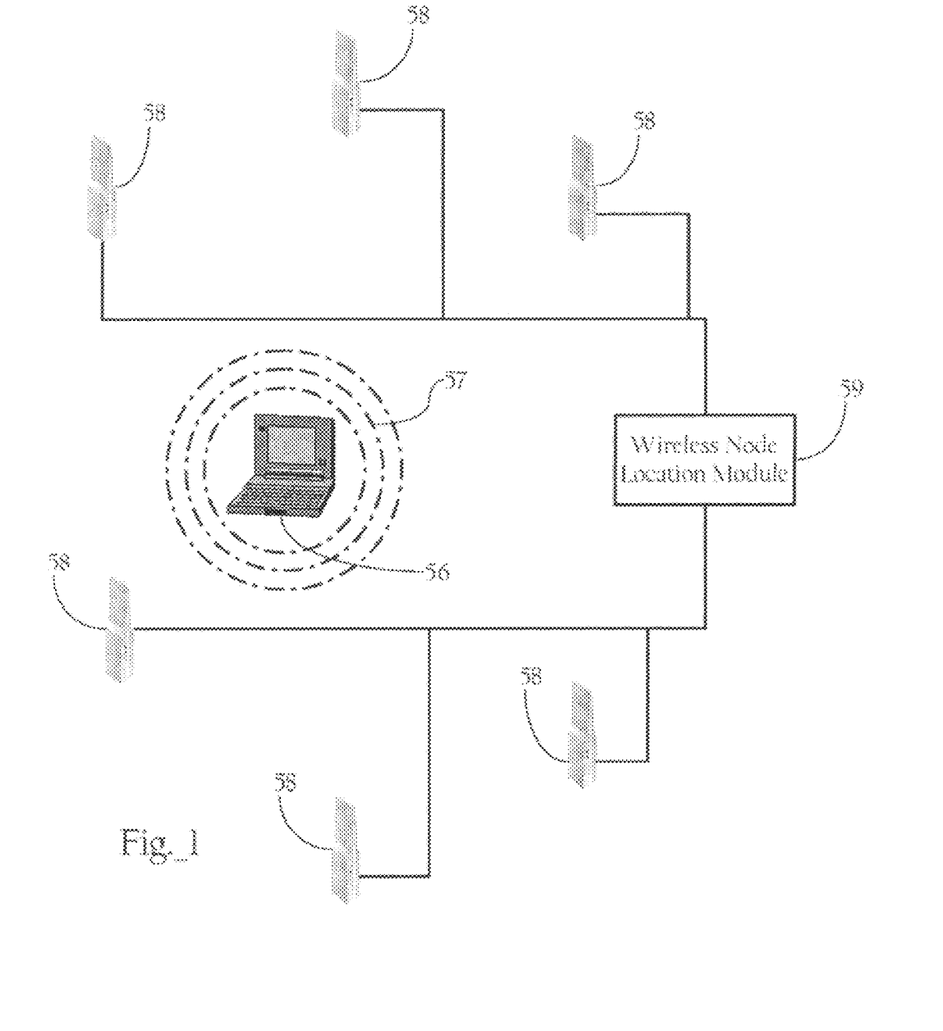
FIG. 1 is a schematic diagram including a wireless node location mechanism according to an implementation of the present invention.

FIG. 1 illustrates the basic operating components of the wireless node location mechanism according to an implementation of the present invention. As FIG. 1 shows, the wireless node location mechanism includes a wireless node location module 59 and a plurality of infrastructure radio transceivers 58 disposed throughout a physical space. One skilled in the art will recognize that the system depicted in FIG. 1 represents an example of the basic components of the invention and is mostly for didactic purposes. As discussed more fully below, the functionality generally denoted by infrastructure radio transceivers 58 and wireless node location module 59 can be integrated into a variety of systems, such as wireless systems dedicated for location of wireless nodes, or WLAN or other wireless network systems.

Infrastructure radio transceivers 58 generally comprise at least one antenna, a radio transmit/receive unit, and control logic (e.g., a 802.11 control unit) to control the transmission and reception of radio signals according to a wireless communications protocol. Infrastructure radio transceivers 58, in one implementation, are disposed in known and/or fixed locations throughout a physical space, such as a room, a collection of rooms, a floor of a building, an entire building, or an arbitrarily-defined region, including outside environments, over which infrastructure radio transceivers 58 provide RF coverage.

A.1. Infrastructure Radio Transceiver

Infrastructure radio transceivers 58 are operative to detect the strength of received radio-frequency signals, such as the signals 57 transmitted by wireless node 56 and by other radio transceivers, and provide the detected signal strength data for corresponding wireless nodes to wireless node location module 59. In one implementation, infrastructure radio transceivers 58 are also operative to transmit and receive wireless or radio-frequency signals according to a wireless communications protocol, such as the IEEE 802.11 WLAN protocol. Infrastructure radio transceivers 58, in one implementation, can operate on a selected channel from a plurality of channels in a given band. In another implementation, infrastructure radio transceivers 58 can also operate in more than one band. For example, infrastructure radio receivers 58 may be configured to operate in either the 802.11a-5 GHz band, and/or the 802.11b/g-2.4 GHz band. In one implementation, infrastructure radio transceivers 58 can be configured to collect the signal strength information associated with wireless nodes and transmit the collected data in response to SNMP or other requests by wireless node location module 59. In other implementations, the infrastructure radio transceivers 58 can transmit signal strength information on a regular or periodic basis. As discussed below, other methods for collecting signal strength data may also be employed.

Identification of wireless nodes depends on the wireless communications protocol in use. For 802.11 WLAN environments, for example, wireless nodes can be identified based on MAC address. Furthermore, wireless nodes can be authorized mobile stations, such as remote client elements 16, 18 (see FIG. 3), rogue systems (e.g., rogue access points and/or rogue mobile stations), as well as authorized access points for which no location information is known. In other implementations, wireless nodes can be identified based on a unique property of the RF signal, such as a given frequency channel, or a unique signal pattern, and the like. For example, the wireless node location functionality may be employed to locate a detected source of interference, such as a non-802.11 compliant device.

In one implementation, infrastructure radio transceivers 58 are also operable to communicate with one or more mobile stations, such as wireless node 56, according to a wireless communication protocol. For example, radio transceiver 58, in one implementation, is an access point or other WLAN component. In one implementation, radio transceiver 58 is operably connected to a Local Area Network (LAN), Wide Area Network (WAN) or other wireline network to bridge traffic between mobile stations and the wireline network. As discussed more fully below, radio transceiver 58 may also be an access element or light weight access point in a wireless network featuring hierarchical processing of protocol information. In one implementation, the radio transceiver 58 implements the 802.11 protocols (where 802.11, as used herein, generically refers to the IEEE 802.11 standard for wireless LANs and all its amendments). Of course, the present invention can be used in connection with any suitable radio-frequency-based wireless network or communications protocol.

In one implementation, infrastructure radio transceivers 58 make use of the signal strength detection functionality residing on a wireless network interface adapter to detect signal strength on a frame-by-frame basis. For example, the IEEE 802.11 standard defines a mechanism by which RF energy is measured by the circuitry (e.g., chip set) on a wireless network adapter or interface card. The IEEE 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). This numeric value is an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. For example, the detected Signal-to-Noise Ratio (SNR) during packet reception can be used in determining overlay signal transmit power. Again, many chip sets include functionality and corresponding APIs to allow for a determination of SNRs associated with packets received from other transceivers 58 and/or wireless node 56. The resulting signal strength information, in one implementation, can be associated with a time stamp corresponding to the receipt of the frame. As discussed herein, this signal strength information can be collected at each infrastructure radio transceiver 58 and/or the wireless node location module 59 in suitable data structures.

A.2. Wireless Node Location Module

Wireless node location module 59, in one implementation, collects signal strength data received from infrastructure radio transceivers 58 and maintains the signal strength data in association with a wireless node identifier, and an identifier for the infrastructure radio transceiver 58 which provided the signal strength data. Wireless node location module 59, in one implementation, is also configured to distinguish between signals received from infrastructure radio transceivers 58 and signals received from other wireless nodes based on the wireless node identifier. In one implementation, wireless node location module 59 maintains a variety of data structures for storing signal strength information. For example, one data structure is used to store the signal strength of signals transmitted between infrastructure radio transceivers 58. In one implementation, wireless node location module 59 stores this signal strength data in a N×N IRT matrix, where N is the number of infrastructure radio transceivers 58. The column entries can correspond to the transmitting transceiver, while the row entries correspond to the receiving transceiver, or vice versa. Various entries in this matrix may be null values as all infrastructure radio transceivers may not, and in most deployments probably will not, be able to detect one another. Wireless node location module 59, in one implementation, maintains signal strength data for all other wireless nodes in tables or other suitable data structures. In one implementation, wireless node location module 59 maintains, for each radio transceiver 58, a separate table including at least two fields: 1) a wireless node identifier; and 2) the detected signal strength. Additional fields may also include a time stamp indicating the time the infrastructure radio transceiver 58 received the signal. In one implementation, when the memory space allocated to the wireless node tables is depleted, the least recently used/updated entry as indicated by the time stamps is overwritten. In one implementation, wireless node location module 59 filters the signal strength data received from the infrastructure radio transceivers 58 against a list of wireless node identifiers in order to identify the appropriate data structure to update. One skilled in the art will recognize that a variety of data structures beyond matrixes and tables can be used.

As discussed above, signal strengths are detected, in one implementation, on a frame-by-frame basis. Accordingly, in one embodiment, the signal strength data maintained by wireless node location module 59 can be updated as the frames/packets are received. In one implementation, the latest signal strength value is used to essentially overwrite the old value. In other implementations, however, an average, moving average or weighted moving average can be used if successive wireless frames corresponding to a given wireless node are encountered within a threshold time interval (e.g., typically resulting from a data stream transmission). In such a situation, the time stamp can correspond to the time of the last packet or frame. In addition, while radio transceivers 58 when operating as access points typically operate on different channels, mobile stations at various times (e.g., transmitting probe requests to find access points) transmit wireless frames on all available operating channels. This helps to ensure that a plurality of infrastructure radio transceivers 58 detect the mobile station. In some implementations, one or more infrastructure radio transceivers 58 that are adjacent to a radio transceiver 58 that detected a given wireless node may be directed to switch to a given operating channel to listen for signals transmitted by the mobile station. Still further, as discussed below, the infrastructure radio transceivers 58 may be commanded to specifically transmit frames on a given channel for the purpose of updating the signal strength data maintained by wireless node location module 59. In yet another embodiment, the infrastructure radio transceiver 58 or other access point with which a given mobile station is associated may be commanded to disassociate the mobile station. This causes the mobile station to transmit probe requests on all available operating channels, refreshing the signal strength data collected by neighboring infrastructure radio transceivers. U.S. patent application Ser. No. 10/788,645 discloses the selective termination of wireless clients to refresh signal strength information in RF location systems.

Wireless node location module 59 also maintains a RF physical model of the coverage area associated with the RF environment. As discussed in more detail below, the RF physical model returns an estimated physical location of a wireless node, given the strength of signals detected by the infrastructure radio transceivers 58, as well as an indication of the infrastructure radio transceivers reporting the signal strengths. In one implementation, the RF physical model characterizes for each infrastructure radio transceiver 58 the received signal strength associated with a wireless transmitter at a given location. For example, in one implementation, the RF physical model comprises, for each antenna, a radio coverage map or matrix that indicates the expected signal strength detected at an infrastructure radio transceiver and received from a wireless node, assuming a uniform transmit power, at a given location defined in x-, and y-coordinates. This database can be populated in a variety of ways. For example, the radio coverage maps can be populated with the results of an extensive site survey, according to which a wireless transmitter is placed at different locations in the physical space. During the site survey, the infrastructure radio transceivers 58 operate in a listening mode that cycles between the antennas and report the resulting signal strength of the signal transmitted by the wireless node used to conduct the site survey. In one implementation, the infrastructure radio transceivers 58 can be configured to transmit the signal strength data back to the wireless transmitter, which may be a laptop computer or other wireless device. The coverage maps are constructed by associating the signal strength and location data in the coverage maps corresponding to each infrastructure radio transceiver. The coverage maps may also be constructed by having a WLAN tester (or other wireless node) simply measure the signal strength of frames transmitted by the infrastructure radio transceivers 58 (e.g., beacon packets) at desired locations within the deployment region. If path loss symmetry is assumed, these values can be used to construct the coverage maps for each of the infrastructure radio transceivers. To estimate the location of the wireless node, wireless node location module 59 determines the location coordinates, or range of location coordinates, that best fit the coverage maps associated with the infrastructure radio transceivers 58 selected to locate the wireless node based on the detected signal strength data, as discussed in more detail below.

In one implementation, a coverage map, for each infrastructure radio transceiver 58, is maintained that includes the signal strengths in an N×M matrix, where N is the number of x-coordinates in the coverage map, and M is the number of y-coordinates in the coverage map. In one implementation, the extent of the physical space model by the coverage maps for each infrastructure radio transceiver 58 are co-extensive. The coverage maps for all infrastructure radio transceivers 58 can be co-extensive with the physical space in which the location system is deployed, or with a boundary configured by a network administrator. In one implementation, however, knowledge of various antenna attributes associated with each infrastructure radio transceiver 58—such as antenna type (e.g., omni-directional, directional), peak gain orientation, beam width, front-to-back isolation—can be used to compress or reduce the size of the coverage maps. In one implementation, the coverage maps can be configured to be substantially coextensive with the antenna pattern of each antenna connected to the infrastructure radio transceivers 58 out to a threshold signal strength or gain level. For example, the coverage map for a given antenna can be compressed to the front or intended coverage area of the directional antenna. Of course, other data structures can be used such as a table including location coordinates stored in association with tuples of signal strengths and infrastructure radio transceiver antenna identifiers. In addition, if the coverage maps are compressed, the search for the best fit across selected coverage maps can be isolated to the overlap between coverage maps associated with the antennas selected to locate the wireless node.

In another implementation, the coverage maps of the RF physical model may be constructed using an RF prediction model of the coverage area, using mathematical techniques like ray-tracing, and the like. In one implementation, the RF prediction model can be computed for each coordinate location in a desired physical space, assuming a uniform wireless node transmit power. The estimated signal strength information for each infrastructure radio transceiver 58 can be used to populate the coverage maps discussed above. In an alternative embodiment, RF prediction models can be computed relative to each infrastructure radio transceiver antenna. Since the present invention allows path loss symmetry and transmit power symmetry between the wireless nodes and the infrastructure radio transceivers 58 to be assumed, the coverage maps for each infrastructure radio transceiver antenna can be populated by using the computed values at each of the coordinate locations in the coverage map. Of course, site survey data can also be used to adjust one or more parameters associated with the RF prediction model used to estimate expected signal strength at the various locations. As above, the boundaries of the coverage maps can be contoured based on the properties of the antennas connected to the infrastructure radio transceivers 58. In addition, the location coordinates in the coverage maps can be two-dimensional, x- and y-coordinates, defining location in a horizontal plane. The location coordinates can also be three-dimensional, x-, y- and z-coordinates. Other coordinate systems can be used, such as spherical coordinates or cylindrical coordinates. In addition, the values of the coordinates can be either global (i.e., longitude and latitude) or expressed relative to an arbitrarily-defined origin. In addition, the granularity of the coordinates in the coverage maps depends on the desired granularity of the wireless node location estimates. Furthermore, in dual-band configurations, separate coverage maps may be maintained for each infrastructure radio transceiver 58 for the different frequency bands (e.g., 2.4 GHz and 5 GHz).

In one implementation, the wireless node location module 59 includes more than one RF physical model of the environment (in one implementation, each RF physical model is a set of coverage maps corresponding to the antennas of the infrastructure radio transceivers 58), and uses signals transmitted between the infrastructure radio transceivers 58 to dynamically select one of the RF physical models (such as a set of coverage maps) that best characterizes the current RF environment. As discussed above, the propagation of RF signals is effected by a variety of objects, including people, that move within an RF environment. In one implementation, the wireless node location functionality can compare the signal strength data in the N×N IRT signal strength matrix and the known locations of the infrastructure radio transceivers against the RF physical models to find the best fit. In one implementation, infrastructure radio transceivers 58 can be configured to transmit wireless frames at regular intervals on one to a plurality of operating channels within a given frequency band to allow for the other infrastructure radio transceivers 58 to detect the signals. U.S. application Ser. No. 10/447,735 discloses the transmission of frames for detection by neighboring WLAN transceivers. In another implementation, infrastructure radio transceivers 58 transmit frames, on demand, in response to a command issued by wireless node location module 59.

Figure 2:
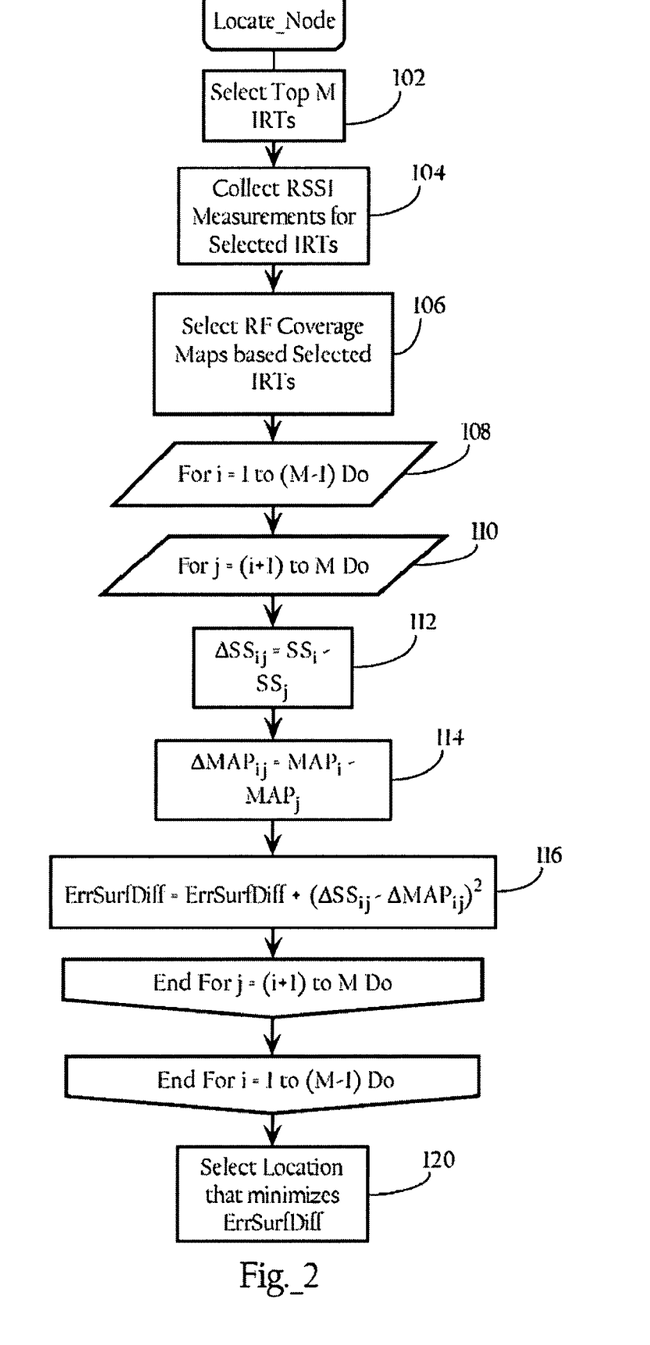
FIG. 2 is a flow chart diagram illustrating the overall process flow directed to the location of a wireless node according to an implementation of the present invention.

FIG. 2 illustrates a method, according to one implementation of the present invention, directed to estimating the location of a wireless node. The wireless node location functionality can be triggered on demand, for example, in response to a command issued by a network administrator using a control interface to locate a mobile station identified by a MAC address or other suitable identifier, such as an arbitrary name associated with a MAC address in a table or other data structure. Wireless node location module 59 may also be triggered automatically in response to the detection of a rogue access point. U.S. application Ser. No. 10/407,370, incorporated by reference above, discloses detection of rogue access points in a wireless network system. Wireless node location module 59 can also be configured to periodically determine the location of a given mobile station in order to track its movement over a period of time.

A.3. Differential Signal Strength Metric

As FIG. 2 illustrates, wireless node location module 59, in one implementation, begins by selecting the infrastructure radio transceivers (IRTs) 58 whose signal measurements will be used in locating the desired wireless node (102). In one implementation, wireless node location module 59 scans the data structures discussed above to identify the infrastructure radio transceivers 58 that see or detect wireless frames transmitted by the desired wireless node. In implementations where signal strength data is regularly collected (as opposed to on demand), the time stamps in the data structures can be used to filter out infrastructure radio transceivers 58 that have not detected the desired wireless node within a threshold period of time. Additional or alternative filter criteria can include a threshold signal strength level (such as −80 dBm). In the implementation shown, wireless node location module 59 selects the M infrastructure radio transceivers 58 that report the strongest signal strengths (where M is a configurable parameter). In one implementation, if an insufficient number of infrastructure radio transceivers 58 are identified, wireless node location module 59 can command the infrastructure radio transceivers 58 to actively scan for the desired wireless node and return signal strength information. Wireless node location module 59 collects the signal strength (e.g., RSSI) measurements corresponding to the selected infrastructure radio transceivers 58 (104), and identifies the RF coverage maps to be used in estimating the location of the wireless node based on selected infrastructure radio transceivers 58 (106).

As FIG. 2 illustrates, wireless node location module 59, computes the difference, $\Delta SS_{ij}$, for each pair of signal strength measurements ($SS_i$ and $SS_j$) among the selected infrastructure radio transceivers 58 (112), as well as the difference, $\Delta MAP_{ij}$, between the coverage maps ($MAP_i$ and $MAP_j$) corresponding to the selected infrastructure radio transceivers 58 (114). In the case of M selected infrastructure radio transceivers 58, there are N choose 2 or $N!/((N-2)!2!)$ pairs of differences. As FIG. 2 shows, wireless node location module 59 constructs a total difference error surface, ErrSurfDiff, by computing, for each unique pair of infrastructure radio transceivers 58 (see 108, 110), the square of the difference between $\Delta SS_{ij}$ and $\Delta MAP_{ij}$, and adding the contribution from each unique pair to ErrSurfDiff (116). To estimate the location of the desired wireless node, wireless node location module 59 selects the location that minimizes the total difference error surface, ErrSurfDiff (120). In one implementation, wireless node location module 59 computes the estimated location by finding the location that minimizes the Euclidian distance in signal space of the ErrSurfDiff, which essentially minimizes the Euclidian distance in signal space between the detected signal strength value differences and the signal strength value differences between the corresponding coverage maps.

As the foregoing illustrates, wireless node location module 59 essentially searches for the area between each pair of infrastructure radio transceivers 58 where the detected signal strength is different by X dB, where X dB is the difference in the RSSI or other signal strength measurements of the desired wireless node as detected by the two infrastructure radio transceivers. In the ideal case involving no physical barriers are located in the RF environment, the contour where the difference between the two infrastructure radio transceivers 58 predicted signals is a constant X dB can be described by a Cartesian oval. In the practical world, this shape is arbitrary. In the ideal world, summing up several of these create a region of zero error where the Cartesian ovals overlap and non-zero error terms elsewhere. In the real world, the summing up of several of these surfaces creates a total error surface, whose minimums represent the most likely location of the wireless node.

To illustrate the benefits of this differential signal strength metric, assume a N dB difference in the transmit power of the wireless node from an assumed or default transmit power. In the case of three selected infrastructure radio transceivers, this N dB difference factors into the total difference error surface as:

$$ErrSurfDiffTxErr = (((RSSIap1+N)-(RSSIap2+N))-(MAPap1-MAPap2))^2 + (((RSSIap1+N)-(RSSIap3+N))-(MAPap1-MAPap3))^2 + (((RSSIap2+N)-(RSSIap3+N))-(MAPap2-MAPap3))^2,$$

which reduces to the original ErrSurfDiff with no additional errors added. In addition, the differential signal strength metric also addresses the errors in detecting the strength of wireless signals and errors resulting from assuming path loss symmetry. For example, the absolute power assumed by the coverage maps (e.g., MAPap1, MAPap2) may be incorrect by K dB for each client independently. In this metric, those errors are also removed, as shown in the following:

$$ErrSurfDiffAPErr = ((RSSIap1-RSSIap2)-(MAPap1+K)-(MAPap2+K)))^2 + ((RSSIap1-RSSIap3)-((MAPap1+K)-(MAPap3+K)))^2 + ((RSSIap2-RSSIap3)-((MAPap2+K)-(MAPap3+K)))^2,$$

which also reduces to ErrSurfDiff. Accordingly, the differential signal strength metric described herein minimizes the effects of absolute error caused by variations in transmit power, or signal strength detection, as well as lack of symmetry in path loss between a detecting node and a transmitting node.

A.4. Combined Use of Absolute and Differential Signal Strength Metrics

Computationally, the differential signal strength metric described above results in the loss of some information, creating a greater range of locations that may satisfy a given sample set of signal strength values. In other words, use of the differential signal strength metric, in some circumstances and implementations, may result in several, substantially equal minima in the differential error surface discussed above scattered throughout the RF environment. In one implementation, the present invention uses the absolute signal strength values to optimize the location estimate. U.S. patent application Ser. Nos. 10/848,276 and 10/802,366, incorporated by reference herein, disclose the use of absolute signal strength values and coverage maps to compute a total error surface and the selection of a location in the error surface to estimate the location of a wireless node. For example, the estimated location using the absolute signal strength values can be used as guidance in selecting from the substantially equal estimated locations that resulted from the differential metric discussed above.

Figure 5:
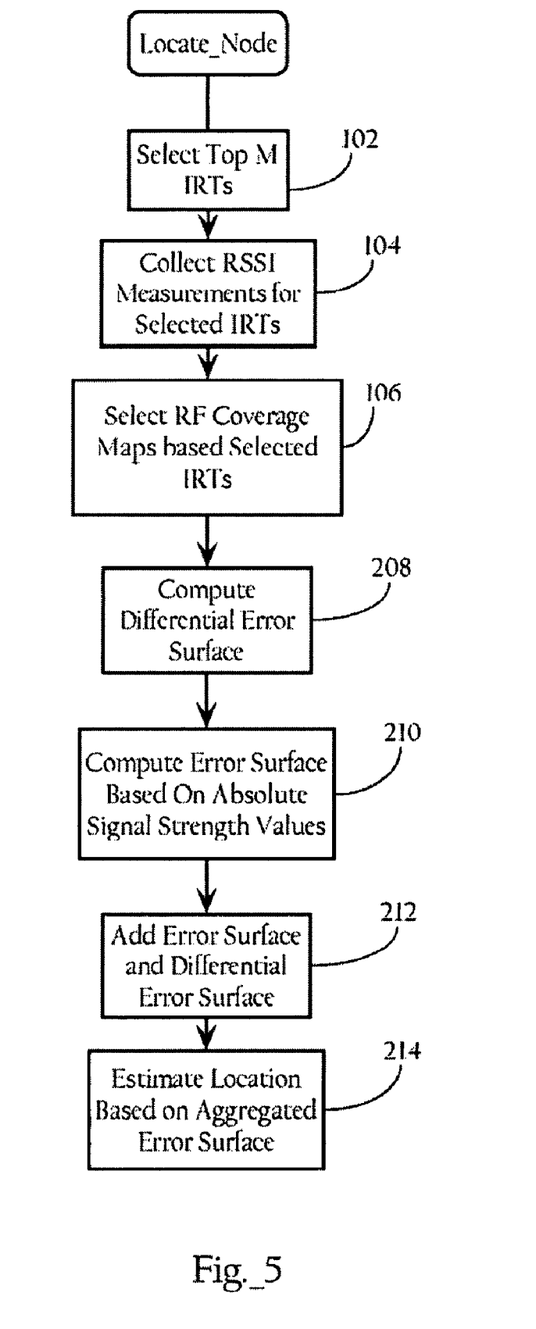
FIG. 5 is a flow chart diagram illustrating the overall process flow directed to estimating the location of a wireless node using a combination of the differential signal strength methodology and an absolute signal strength methodology.

FIG. 5 illustrates a process that incorporates use of the absolute signal strength values in connection with the differential signal strength metric according to one implementation of the present invention. As FIG. 5 illustrates, wireless node location module 59 computes the differential error surface (208), after collecting the signal strength samples from selected infrastructure radio transceivers 58 and selecting the corresponding coverage maps (102, 104, 106), as discussed above. Wireless node location module 59, in one implementation, also computes an error surface based on the absolute signal strength values detected by the infrastructure radio transceivers 58 (210). On the implementation shown, the error surface and the differential error surface are added together to essentially overlay the information provided by use of the absolute signal strength values to the differential signal strength computations (212). Wireless node location module 59 then estimates the location of the wireless node based on the aggregated error surface. In one implementation, the estimated location is the location that minimizes the aggregated error.

variety of implementations are possible. For example, the contributions of the differential error surface and the absolute error surface can be weighted. The weighting can be based on a heuristic evaluation of the RF environment in which the location system operates, and may further include analysis of factors such as whether the wireless node (e.g., an RF ID tag) is contained within an object such as a container. For example, in one implementation, if the location system of the present invention were used to locate RFID tags located within physical containers, the contribution of the absolute error surface would typically receive a lower weighting value.

The absolute error surface can be used in other ways relative to the differential signal strength metric. For example, the location estimate resulting from the use of the absolute error surface can be used to select between a plurality of equally plausible minima corresponding to the differential error surface (e.g., where the possible locations are within a threshold range of being the likely location). In one implementation, wireless node location module 59 can be configured to select the location from the likely locations in the differential error surface that is closest to the most likely location that was computed using the absolute error surface.

B. Integration into Wireless Network Systems

Figure 3:
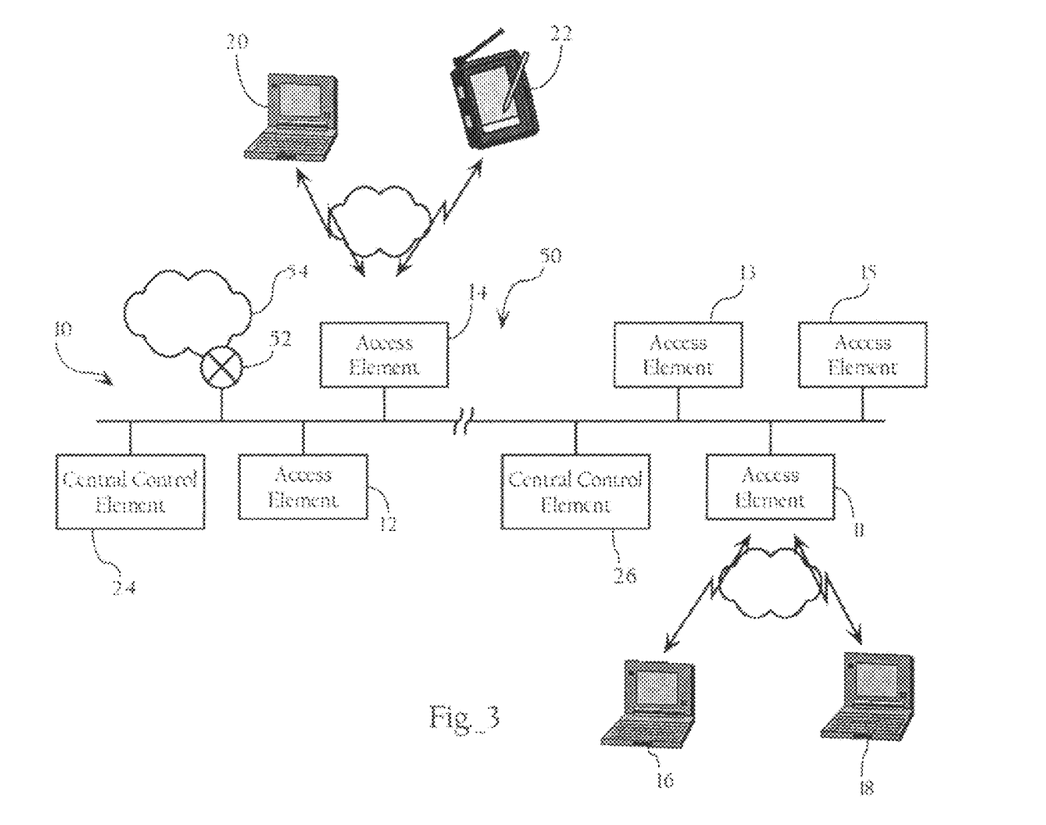
FIG. 3 is a functional block diagram illustrating a wireless network system according to an implementation of the present invention.

In one implementation, the wireless node location functionality discussed above can be integrated into a wireless network infrastructure, such as the hierarchical WLAN system illustrated in FIG. 3. For example, the wireless node location functionality described herein may be integrated into a WLAN environment as disclosed in U.S. application Ser. Nos. 10/155,938 and 10/407,357 incorporated by reference herein. The wireless node location functionality according to the present invention, however, may be applied to other wireless network architectures. For example, the wireless node location functionality may be integrated into a wireless network infrastructure including a plurality of substantially autonomous access points that operate in connection with a central network management system.

Referring to FIG. 3, there is shown a block diagram of a wireless Local Area Network system according to an embodiment of the invention. A specific embodiment of the invention includes the following elements: access elements 11-15 for wireless communication with selected client remote elements 16, 18, 20, 22, central control elements 24, 25, 26, and means for communication between the access elements and the central control elements, such as direct line access, an Ethernet network, such as LAN segment 10. As disclosed in U.S. patent application Ser. No. 10/407,357, the access elements, such as access elements 11-15 are directly connected to LAN segment 10 or a virtual local area network (VLAN) for communication with a corresponding central control element 24, 26. See FIG. 3. As disclosed in U.S. patent application Ser. No. 10/155,938, however, access elements 11-15 may also be directly connected to respective central control elements 24, 26 via direct access lines.

The access elements 11-15 are coupled via communication means using a wireless local area network (WLAN) protocol (e.g., IEEE 802.11a or 802.11b, etc.) to the client remote elements 16, 18, 20, 22. As described in U.S. application Ser. Nos. 10/155,938 and 10/407,357, the access elements 12, 14 and the central control element 24 tunnel network traffic associated with corresponding remote client elements 16, 18; 20, 22 via direct access lines or a LAN segment 10. Central control elements 24, 26 are also operative to bridge the network traffic between the remote client elements 16, 18; 20, 22 transmitted through the tunnel with corresponding access elements 11-15. In another implementation, access elements 11-15 may be configured to bridge the network traffic on LAN segments 10, while sending copies of the bridged frames to the access elements for data gathering and network management purposes.

As described in the above-identified patent applications, central control elements 24, 26 operate to perform data link layer management functions, such as authentication and association on behalf of access elements 11-15. For example, the central control elements 24, 26 provide processing to dynamically configure a wireless Local Area Network of a system according to the invention while the access elements 11-15 provide the acknowledgment of communications with the client remote elements 16, 18, 20, 22. The central control elements 24, 26 may for example process the wireless LAN management messages passed on from the client remote elements 16, 18; 20, 22 via the access elements 11-15, such as authentication requests and authorization requests, whereas the access elements 11-15 provide immediate acknowledgment of the communication of those messages without conventional processing thereof. Similarly, the central control elements 24, 26 may for example process physical layer information. Still further, the central control elements 24, 26, as discussed more fully below, may for example process information collected at the access elements 11-15 on channel characteristics, signal strength, propagation, and interference or noise.

Figure 4:
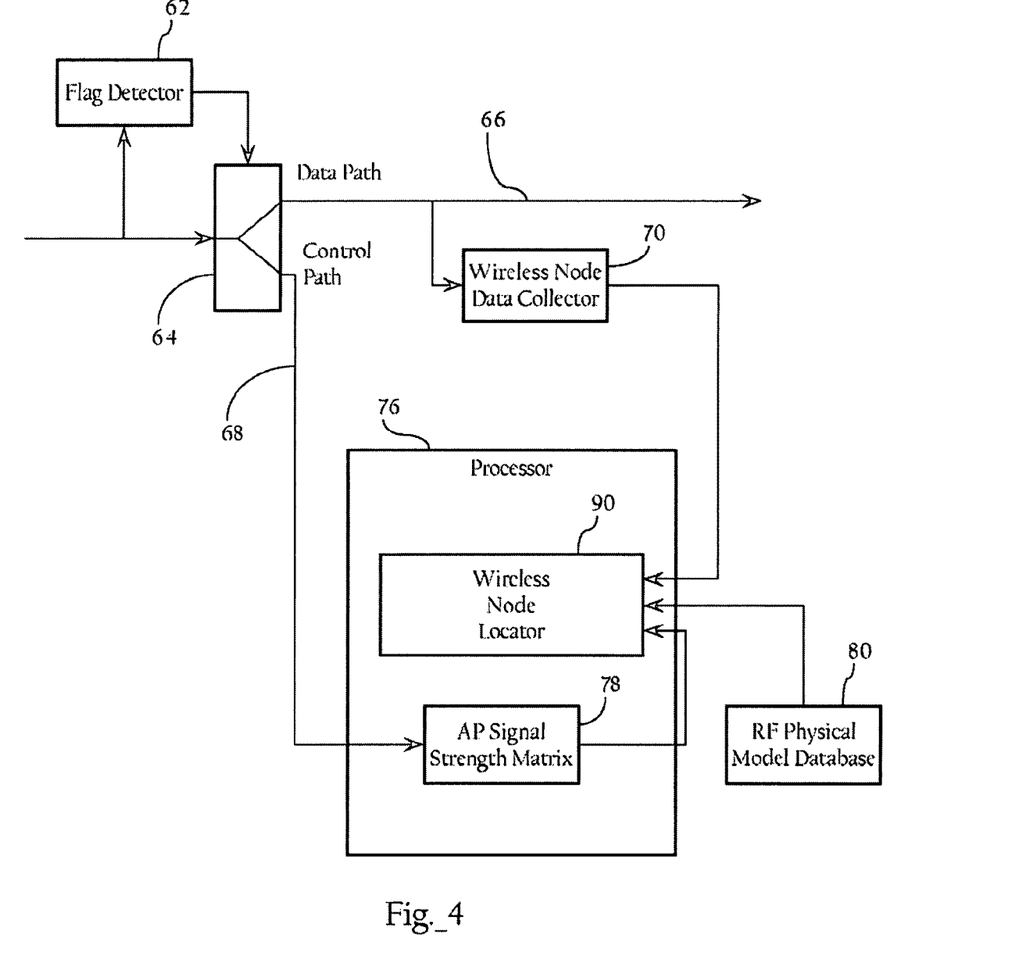
FIG. 4 is a functional block diagram showing the wireless node location functionality of a central control element in the wireless network system of FIG. 3.

Central control elements 24, 26, as shown in FIG. 4, may be configured to gather the signal strength data discussed above to support the wireless node location functionality according to the present invention. The signal strength data gathering functionality described herein is quite similar to the data gathering disclosed in U.S. application Ser. No. 10/183,704, incorporated by reference above. In that application, access elements 11-15 append signal strength data to packets received from wireless nodes, typically, in encapsulating headers. The central control elements 24, 26 process the encapsulating packet headers to update various data structures, such as the N×N AP signal strength matrix and wireless node tables discussed above in Section A. U.S. application Ser. No. 10/183,704 discloses the internal operating components and general configuration of access elements 11-15 that can be used in connection with the integrated wireless node location functionality described herein.

FIG. 4 illustrates the logical configuration of central control elements 24, 26, according to an implementation of the present invention. As discussed in U.S. application Ser. No. 10/183,704, in one implementation, there is both a logical data path 66 and a control path 68 between a central control element 24 or 26 and an access element (e.g., access element 11). The control path 68 allows the central control element 24 or 26 to communicate with the radio access elements 11-15 and acquire the signal strength between the radio access elements. By monitoring the data path 66, the central control element 24, 26 can obtain the signal strength of the signals transmitted by other wireless nodes.

More specifically, the wireless node locator 90 in the central control element 24 or 26 collects information from a plurality of access elements via a control channel 68 and a data channel 66. The central control element 24 or 26 receives and transmits data packets and control packets from/to a plurality of access elements 11-15 as described above. A flag detector 62 distinguishes between data packets and control packets, routing them through a logical switch 64 to a high-speed data path 66 in communication with the wired network 15 or to control path 68 within the central control element 24 or 26. The data path 66 is monitored by a wireless node data collector 70. Associated with each data packet is a resource management header which contains RF physical layer information, such as the power in the channel before each received packet, an identifier for the access element receiving the signal, as well as an identifier for the antenna selected to receive the signal. This information, together with the 802.11 protocol information in the native frames, can be used to maintain one or more data structures that maintain signal strength data for the wireless nodes detected by the access elements 11-15, as discussed in section A, above. The control path 68 is coupled to a processor element 76 in which an AP signal strength matrix 78 is maintained. The AP signal strength matrix 78 collects information quantifying the signal strength between access elements 11-15. All of the signal strength data are collected at the access elements 11-15 and communicated over the data path and control path to the central control element 24 or 26, in one implementation, as packetized information in the resource management header in the data path and resource management control packets in the control path, respectively.

As discussed above, in one implementation, the wireless node location function uses signal strength data between access elements to select a RF physical model that best characterizes the current RF environment. To support such an implementation, one task is to create and maintain an AP signal strength matrix for all the remote access elements in the various wireless networks which detect each other's signals. This is accomplished, in one implementation, by having the wireless node locator 90 in the central control element 24 or 26 and a Resource Manager in the access elements 11-15 both passively listen to surrounding access elements and actively probe for surrounding access elements. The wireless node locator in the central control element 24 or 26 can schedule an access element 11-15 in the wireless network to transmit a data measurement request on a specified channel and then record responses from surrounding access elements. The data measurement probe request and the receiver information bandwidth can have a narrower information bandwidth than the normal information bandwidth in order to allow the dynamic range of the receiver to be extended beyond its normal operational range. This allows a radio element to "see" access elements beyond its normal operating range. Scheduling these measurements allows multiple measurements to be made with a single transmission and allows the detection of the transmitting signal to be recognized as a change in amplitude relative to the background noise at the scheduled time, allowing for easier detection of the measurement signal and greater dynamic range. The resulting data can be transmitted in control packets collected by AP signal strength matrix 78 on the control path 68. Passively, for each packet received on the data channel at the access element a measurement of the power in the RF channel is made immediately before the received packet. This interference measurement is sent to the central control element via the data channel by appending a Radio Resource Manager header to the data packet. Alternatively, the access elements may be configured to flag packets received from other access elements such that they are transmitted on the control path 68.

FIG. 4 also illustrates an RF physical model database 80 containing the one or more coverage maps associated with the access elements 11-15. When activated, the wireless node locator 90 can operate as discussed above to compute the estimated location of a desired wireless node, and return the estimated location to the requesting system, such as a network management system or a control interface. In the WLAN system depicted in FIG. 3, several implementations are possible. For example, central control element 24 may be configured as a "master" central control element for purposes of wireless node location. That is, data collected at all central control elements is ultimately transmitted (either regularly or on demand) from other central control elements (e.g., central control element 26) to the master central control element 24 which computes the estimated location. Alternatively, the collected data can be transmitted to a network management system that performs the location computations discussed above. Alternatively, central control elements 24, 26 (when deployed in separate physical spaces, such as separate floors or buildings) may operate substantially autonomously.

The invention has been explained with reference to specific embodiments. For example, although the embodiments described above operate in connection with 802.11 networks, the present invention can be used in connection with any wireless network environment. In addition, although the embodiments described above operate in connection with a RF physical model including a plurality of coverage maps or matrixes, other data structures can be used to store the RF physical model data. Still further, although the embodiments described above compute estimated location based on signal strengths detected by infrastructure access points or elements, the differential signal strength metric can be used by client wireless nodes, such as mobile stations in the RADAR system. In addition, while the location algorithms discussed above consider the square of the Euclidean distance between the RSSI vector and the MAP vector at a particular location, other minimization functions can be considered, including minimum mean squared error, minimum distance, and minimum Manhattan grid distance. Other embodiments will be evident to those of ordinary skill in the art. It is therefore not intended that the invention be limited except as indicated by the appended claims.

What is claimed is:

1. A method for estimating the location of a wireless node relative to a plurality of radio receivers operative to detect the strength of radio frequency (RF) signals, wherein a plurality of RF coverage maps are associated with the plurality of radio receivers, wherein each RF coverage map corresponds to one of the radio receivers, and characterizes the signal strength values for locations in a physical region for the corresponding radio receiver, comprising:

collecting signal strength values, detected at a plurality of radio receivers, corresponding to signals transmitted by a wireless node;

determining a differential error surface comprising, for all unique pairs of three or more radio receivers of the plurality of radio receivers, the sum of the squares of the difference between the signal strength values detected by each pair of radio receivers less the difference between the signal strength values in the RF coverage maps associated with the pair of radio receivers; and estimating the location of the wireless node using the differential error surface, wherein the wireless node comprises an RF ID tag.

* * * * *